US011254575B2

(12) United States Patent
Tatarova et al.

(10) Patent No.: US 11,254,575 B2
(45) Date of Patent: Feb. 22, 2022

(54) PROCESS, REACTOR AND SYSTEM FOR FABRICATION OF FREE-STANDING TWO-DIMENSIONAL NANOSTRUCTURES USING PLASMA TECHNOLOGY

(71) Applicant: INSTITUTO SUPERIOR TECNICO, Lisbon (PT)

(72) Inventors: Elena Stefanova Tatarova, Carcavelos (PT); Julio Paulo Dos Santos Duarte Vieira Henriques, Póvoa de Santa Iria (PT); Luis Paulo Da Mota Capitao Lemos Alves, Carnaxide (PT); Bruno Miguel Soares Goncalves, Alverca do Ribatejo (PT)

(73) Assignee: INSTITUTO SUPERIOR TÉCNICO, Lisbon (PT)

( * ) Notice: Subject to any disclaimer, the term of this patent is extended or adjusted under 35 U.S.C. 154(b) by 414 days.

(21) Appl. No.: 16/300,611

(22) PCT Filed: May 11, 2017

(86) PCT No.: PCT/PT2017/000007
§ 371 (c)(1),
(2) Date: Nov. 12, 2018

(87) PCT Pub. No.: WO2017/196198
PCT Pub. Date: Nov. 16, 2017

(65) Prior Publication Data
US 2020/0123010 A1   Apr. 23, 2020

(30) Foreign Application Priority Data
May 13, 2016 (PT) .................................. 109387

(51) Int. Cl.
*C01B 32/184* (2017.01)
*B01J 12/00* (2006.01)
(Continued)

(52) U.S. Cl.
CPC .......... *C01B 32/184* (2017.08); *B01J 12/002* (2013.01); *H05H 1/46* (2013.01); *B82Y 30/00* (2013.01);
(Continued)

(58) Field of Classification Search
CPC .... C01B 32/184; C01B 32/186; B01J 12/002; H05H 1/46; H05H 2001/4615;
(Continued)

(56) References Cited

U.S. PATENT DOCUMENTS 4,908,329 A * 3/1990 Kanai ................... C23C 16/306
427/575
4,989,542 A  2/1991 Kamo
(Continued)

FOREIGN PATENT DOCUMENTS

CN   1039680 A * 2/1990 ........... C23C 16/511
GB   2527209     12/2015
(Continued)

OTHER PUBLICATIONS

Tsyganov, D., et al. "On the plasma-based growth of 'flowing' graphene sheets at atmospheric pressure conditions." Plasma Sources Science and Technology 25.1 (2015): 015013.*
Lamontagne, B., et al. "Large-area microwave plasma etching of polyimide." Journal of Physics D: Applied Physics 20.7 (1987): 844.*
(Continued)

*Primary Examiner* — Richard M Rump
(74) *Attorney, Agent, or Firm* — Porzio Bromberg & Newman P.C.

(57) ABSTRACT

The present invention relates to a process, reactor and system to produce self-standing two-dimensional nanostructures, using a microwave-excited plasma environment. The process is based on injecting, into a reactor, a mixture of gases and precursors in stream regime. The stream is subjected to a surface wave electric field, excited by the use of microwave power which is introduced into a field applicator,
(Continued)

generating high energy density plasmas, that break the precursors into its atomic and/or molecular constituents. The system comprises a plasma reactor with a surface wave launching zone, a transient zone with a progressively increasing cross-sectional area, and a nucleation zone. The plasma reactor together with an infrared radiation source provides a controlled adjustment of the spatial gradients, of the temperature and the gas stream velocity.

14 Claims, 7 Drawing Sheets

(51) Int. Cl.
*H05H 1/46* (2006.01)
*B82Y 30/00* (2011.01)
*B82Y 40/00* (2011.01)

(52) U.S. Cl.
CPC .......... *B82Y 40/00* (2013.01); *C01P 2004/20* (2013.01); *C01P 2004/64* (2013.01); *H05H 1/4615* (2021.05)

(58) Field of Classification Search
CPC ..... B82Y 30/00; B82Y 40/00; C01P 2004/20; C01P 2004/64
See application file for complete search history.

(56) References Cited

U.S. PATENT DOCUMENTS

| 6,998,103 | B1 | 2/2006 | Phillips et al. |
| 2010/0301212 | A1 | 12/2010 | Dato et al. |
| 2011/0180385 | A1 | 7/2011 | Imholt |
| 2017/0113935 | A1* | 4/2017 | Pennington ............. H05H 1/46 |

FOREIGN PATENT DOCUMENTS

| JP | 01315140 | 12/1989 |
| JP | H0634244 | 5/1994 |

OTHER PUBLICATIONS

International Search Report, PCT/PT2017/000007, dated Dec. 18, 2017.
Dato et al, "Substrate-Free Gas-Phase Synthesis of Graphene Sheets" 2008 Nano Letters 8 2012.
E. Tatarova, J. Henriques, C.C. Luhrs, A. Dias, J. Phillips, M.V. Abrashev, C.M. Ferreira, "Microwave plasma based single step method for free standing graphene synthesis at atmospheric conditions" 2013 Appl. Phys. Lett. 103 134101-5.
E. Tatarova, et al., "Microwave plasmas applied for the synthesis of free standing graphene sheets" 2014 J. Phys D: Appl. Phys. 47 385501-512.
Tatarova et al., Towards large scale in free standing graphese and N-graphee sheets, Scientific Reports, 7, 1, Aug. 2017.

* cited by examiner

PROCESS, REACTOR AND SYSTEM FOR FABRICATION OF FREE-STANDING TWO-DIMENSIONAL NANOSTRUCTURES USING PLASMA TECHNOLOGY

FIELD OF THE INVENTION

The present invention generally relates to a process and to a reactor and system for the selective fabrication of free-standing two-dimensional nanostructures using plasma technology, in particular microwave plasma.

BACKGROUND OF THE INVENTION

Currently, the development of new two-dimensional nanostructures is considered one of the science and technology research areas that presents greater demand and, as such, with greater strategic value.

Graphene is the most eminent example of a two-dimensional (carbon-based) nanostructure with an increasing demand, as it possesses many extraordinary properties, with potential applications in numerous scientific and engineering disciplines.

However, mechanical, optical, and electrical performances of graphene crucially depend on its structural characteristics, i.e., number of mono-layers (whose growth limits the desirable quantum mechanical properties), presence of $sp^3$ carbons, defects, etc . . . .

Currently, the processes used for graphene production are based on one of two different approaches, hereinafter referred to "top-down" or "bottom-up".

Graphene of the highest quality can be obtained by mechanically exfoliating highly oriented pyrolytic graphite, this process can be considered the most common example of the "top-down" approach. However, this process leads to relatively low production rates (around 1 mg/h), when compared to the reference level for industrial applications (about 1 g/h).

The production of graphene oxide from graphite, followed by the thermal reduction of graphene oxide, is a second example of a "top-down" production strategy, which despite having much higher production rates (more than 1 g/h), leads to a highly defective product (S. Mao, H. Pu, J. Chen, "Graphene oxide and its reduction: modeling and experimental progress" 2012 RSC Adv. progress 2 2643).

"Bottom-up" approaches include epitaxial growth, chemical vapor deposition (CVD) and vacuum graphitization of silicon carbide substrates, among others. These techniques present several drawbacks, such as degradation of nanostructure properties due to the interference from transition metals, the need to use expensive catalysts (Fe, Co, Cu, Ni, etc.), the very high processing temperatures, the length and complexity of production procedures, the use of hazardous chemicals and, above all, the very limited control over the assembly process of nanostructures (E. Tatarova et al, "Plasmas for Environmental Issues: From hydrogen production to 2D materials assembly" 2014 Plasma Sources Sci. Technol. 23 063002-063054).

Therefore, existing techniques are not yet capable of providing two-dimensional nanostructures with pre-defined and well controlled physicochemical and structural properties, while at the same time ensuring production rates appropriate to industrial applications.

To the previous constraints, it should be added that state of the art "bottom-up" approaches generally require the use of a substrate, consisting of a solid surface, which may limit the success of the intended applications.

For example, when the aim is to create energy storage and conversion devices, or the development of new composite materials, the use of free-standing graphene structures (i.e., without support substrates) is a more attractive alternative to said horizontal graphenes and graphenes supported by substrates, where one side of the graphene sheet is implanted on a solid substrate surface.

In fact, in terms of applications, self-standing graphenes have the obvious advantage of being able to use both surfaces and at least three open edges, while substrate bound graphenes use one surface only.

Recently, microwave plasmas have been used in the "aerosol-through-plasma" technique (a "bottom-up" approach) to produce a multitude of self-standing nanostructures that are of interest in many fields (J. Phillips, D. Mendoza, C.-K. Chen, "Method for producing metal oxide nanoparticles" 2008 U.S. Pat. No. 7,357,910 B2), including graphene (J. Phillips, C. C. Luhrse, M. Richard 2009 IEEE Trans. Plasma Sci. 37 726).

In the work of Dato et al, "Substrate-Free Gas-Phase Synthesis of Graphene Sheets" 2008 Nano Letters 8 2012 it has proved that is possible to produce graphene autonomously, without the need of using three-dimensional materials or substrates.

However, one should emphasize that this work maintains other previously mentioned constraints, namely the low purity of the nanostructures produced, of which only some are graphene sheets constituted by two or three carbon layers (the remaining correspond to other carbon allotropes), and the low production rates achieved (about 1 mg/h).

In order to control the number of atomic mono-layers and the structural quality (defects, impurities, etc.) of the two-dimensional nanostructures produced, a novel microwave plasma-assisted process was proposed that allows to select the final product in a deterministic way.

This process, that was used to produce self-standing graphene sheets, is based on injecting a liquid precursor, such as ethanol, through a microwave argon plasma, where decomposition of ethanol takes place. The carbon atoms and molecules, produced by the plasma in gas phase, diffuse into cooler zones of the system, where they aggregate into solid carbon nuclei.

This process is described in the following works: E. Tatarova, J. Henriques, C. C. Luhrs, A. Dias, J. Phillips, M. V. Abrashev, C. M. Ferreira, "Microwave plasma based single step method for free standing graphene synthesis at atmospheric conditions" 2013 Appl. Phys. Lett. 103 134101-5; E. Tatarova, A. Dias, J. Henriques, A. M. Botelho do Rego, A. M. Ferraria, M. V. Abrashev, C. C. Luhrs, J. Phillips, F. M. Dias, C. M. Ferreira, "Microwave plasmas applied for the synthesis of free standing graphene sheets" 2014 J. Phys D: Appl. Phys. 47 385501-512.

These works solve partially the problem of the simultaneous production of different carbon allotropes (limited to about 30% of the total nanostructures produced), allowing to produce graphene sheets with a high structural quality (1-3 atomic layers) comparable to that of graphene materials available on the market but with the advantage of being self-standing, i.e. with the advantage of not having support substrate, as mentioned before.

However, these proposals have not solved other above mentioned problems, such as the low graphene production rate, of about 0.5 mg/h, and the relatively low purity level of the obtained product, which is produced with oxygen incorporated.

Thus, there is a need in the art of a process, as well as a reactor and system for the production of self-standing two-dimensional nanostructures that solve the above-mentioned problems of the prior art.

In particular, it is necessary a production process of free-standing two-dimensional nanostructures and a reactor and system to implement that process, which are capable of providing higher purity levels of the nanostructures resulting therefrom, as well as better industrial production rates.

Additional objectives, advantages and functionalities of the present invention will be put forward in the following description, and can be naturally developed and improved with practical use.

The objectives of the present invention are achieved by the process, reactor and system claimed in the annexed independent claims, being the dependent claims used to define particular embodiments of the present invention.

SUMMARY OF THE INVENTION

The present invention relates to a process of production of self-standing two-dimensional nanostructures, characterized in that it comprises the steps of:
  (a) producing a stream of a mixture of at least one inert gas and at least one precursor,
  (b) decomposing the precursor of previous step, into its atomic and molecular constituents by means of a microwave plasma,
  (c) exposing the precursor constituents formed in the previous step to infrared radiation and, subsequently,
  (d) collecting the nanostructures resulting from the nucleation of precursor constituents.

In one embodiment, the process further comprises subjecting the precursor constituents to ultraviolet radiation in step c), wherein the ultraviolet radiation is generated by an ultraviolet radiation source operating in a power range comprised between 50 W to 3000 W, preferably between 100 W to 2500 W, more preferably between 150 W to 2000 W, most preferably between 200 W to 1500 W.

In another embodiment, the process further comprises, between step (a) and step (b), a cooling of the said stream by means of a cooling device operating in a temperature range comprised between 40 to 220° C., preferably between 40 to 200° C., more preferably between 40 to 180° C., most preferably between 40 to 150° C.

In one aspect, the said stream produced in step (a) has a flow rate comprised between $4.2 \times 10^{-6}$ and $8.3 \times 10^{-4}$ m$^3$/s, preferably between 8.3×10-6 and 3.3×10-4 m$^3$/s, more preferably between $1.7 \times 10^{-5}$ and $1.7 \times 10^{-4}$ m$^3$/s.

In another aspect, the said inert gas of the mixture of step (a) is selected from the group consisting of helium, neon, argon, krypton, xenon and combinations thereof; and the precursor is selected from the group consisting of methane, ethylene, ethanol, methanol, propanol, butanol, acetylene, diborane, germanium monoxide, germanium dioxide, nitrogen and combinations thereof.

The said microwave plasma is generated by a microwave source operating in a power range from 100 W to 60000 W.

The said infrared radiation is generated by an infrared radiation source (11) operating in a power range comprised between 50 W to 3000 W, preferably between 100 W to 2500 W, more preferably between 150 W to 2000 W, most preferably between 200 W to 1500 W.

The invention also refers to a microwave plasma reactor for the fabrication of free-standing two-dimensional nanostructures, the reactor having a hollow body (1) comprising:
  a plasma creation surface wave launching part (19),
  a precursor constituents nucleation part (21) and
  a transient part (20) having the first and the second ends connected, respectively, to the surface wave launching part (19) and to the nucleation part (21), providing fluid communication between these parts (19, 21),
  wherein the said parts (19, 20, 21) define, respectively, in the body (1) three inner zones of operation (19', 20', 21'),
  characterized in that the first end of the transient part (20) has a cross-sectional area which is smaller than a cross-sectional area of the second end.

Preferably, the cross-sectional area of the transient part (20) is progressively increasing from its first to its second end.

In one embodiment, the said parts (19, 20, 21) are integrally connected to each other, forming a single piece.

The reactor hollow body (1) is formed by a dielectric material selected from the group consisting of quartz, sapphire, alumina and combinations thereof.

In another embodiment, the reactor hollow body (1) further comprises a part (8) of admission of a mixture of at least one inert gas and at least one precursor, being the admission part (8) integrated in the surface wave launching part (19) or attached to the surface wave launching part (19) through connections.

Additionally, the invention relates to a production system of self-standing two-dimensional nanostructures, the system comprising:
  a microwave plasma reactor having a hollow body (1) comprising, at least, a surface wave launching part (19), a plasma formation transient part (20), and a nucleation part (21) of precursor constituents; the said parts (19, 20, 21) define respectively in the reactor three inner zones (19', 20', 21') of operation that are connected sequentially in fluid communication with each other,
  characterized in that it further comprises
  at least, one infrared radiation source (11) on the outside of the plasma reactor hollow body (1), arranged to irradiate the inner zone (21') defined by the nucleation part (21) of the said reactor body (1).

In one embodiment, the system further comprises a cooling device (10) on the outside of the plasma reactor hollow body (1), wherein the cooling device (10) is arranged to cool, at least, the inner zone (20') defined by the transient part (20) of the said reactor body (1).

The said cooling device (10) is operable in a temperature range between 40 to 220° C., preferably between 40 to 200° C., more preferably between 40 to 180° C., most preferably between 40 to 150° C.

In another embodiment, the system further comprises an ultraviolet radiation source on the outside of the plasma reactor hollow body (1), arranged to irradiate, at least, the inner zone (21') defined by the nucleating part (21) of the said reactor body (1).

In yet another embodiment, the said parts (19, 20, 21) of the reactor body (1) are integrally connected to each other, forming a single piece.

The said reactor body (1) is formed by a dielectric material selected from the group consisting of quartz, sapphire, alumina and combinations thereof.

In a very preferred embodiment, the system for the production of self-standing two-dimensional nanostructures is characterized by comprising:
  a microwave plasma reactor having a hollow body (1) comprising at least:
    a plasma creation surface wave launching part (19), a precursor constituents nucleation part (21) and a transient part (20) having the first and the second ends connected, respectively, to the surface wave launching part (19) and to the nucleation part (21), providing fluid communication between these parts (19, 21), wherein the said parts (19, 20, 21) define respectively in the reactor body (1) three inner zones (19', 20', 21') of operation; and the said first end of the transient part (20) has a smaller cross-sectional area than the cross-sectional area of the said second end of the transient part (20), and at least, one infrared radiation source (11) on the outside of the said reactor hollow body (1), arranged to irradiate the inner zone (21') defined by the nucleating part (21) of the said reactor body (1).

Preferably, the system of the foregoing embodiment further comprises a cooling device (10) on the outside of the reactor body (1), wherein the cooling device (10) is arranged to cool, at least, the inner zone (20') defined by the transient part (20) of the said reactor body (1), being the said cooling device (10) operable in a temperature range between 40 to 220° C., preferably between 40 to 200° C., more preferably between 40 to 180° C., most preferably between 40 to 150° C.

Preferably, the system of the foregoing embodiment further comprises an ultraviolet radiation source on the outside of the plasma reactor hollow body (1), arranged to irradiate at least the inner zone (21') defined by the nucleation part (21) of the said reactor body (1).

BRIEF DESCRIPTION OF DRAWINGS

The accompanying drawings and photographs illustrate exemplificative embodiments and typical results of the present invention and, together with the description, serve to explain the principles of the invention.

DETAILED DESCRIPTION OF THE INVENTION

The present invention relates to a process and to a reactor and system that uses microwave plasmas to selectively produce self-standing two-dimensional nanostructures, which are advantageously constituted by a few atomic layers only and created in the form of flakes in suspension, with production rates of the order of one gram per hour (1 g/h).

The process, reactor and system of the invention allows, by monitoring the operating conditions, the selective production of nanostructures, namely, the generation of a single two-dimensional atomic monolayer allotrope.

Figure 5:
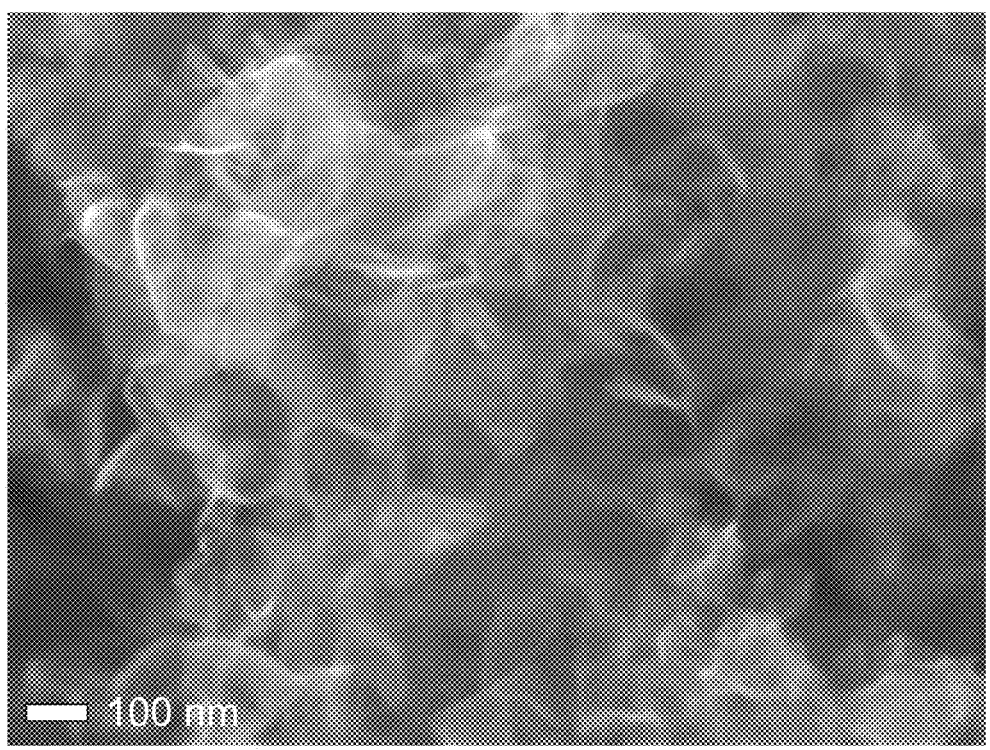
FIG. 5 shows an example of a scanning electron microscopy (SEM) image, obtained using the result of the selective synthesis of graphene sheets, with a scale bar of 100 nm, controlled with strong axial gradients of temperature and velocity. This image with 40000× magnification was obtained in SEI mode with secondary electrons and with an applied working voltage of 15.0 kV.
Figure 6:
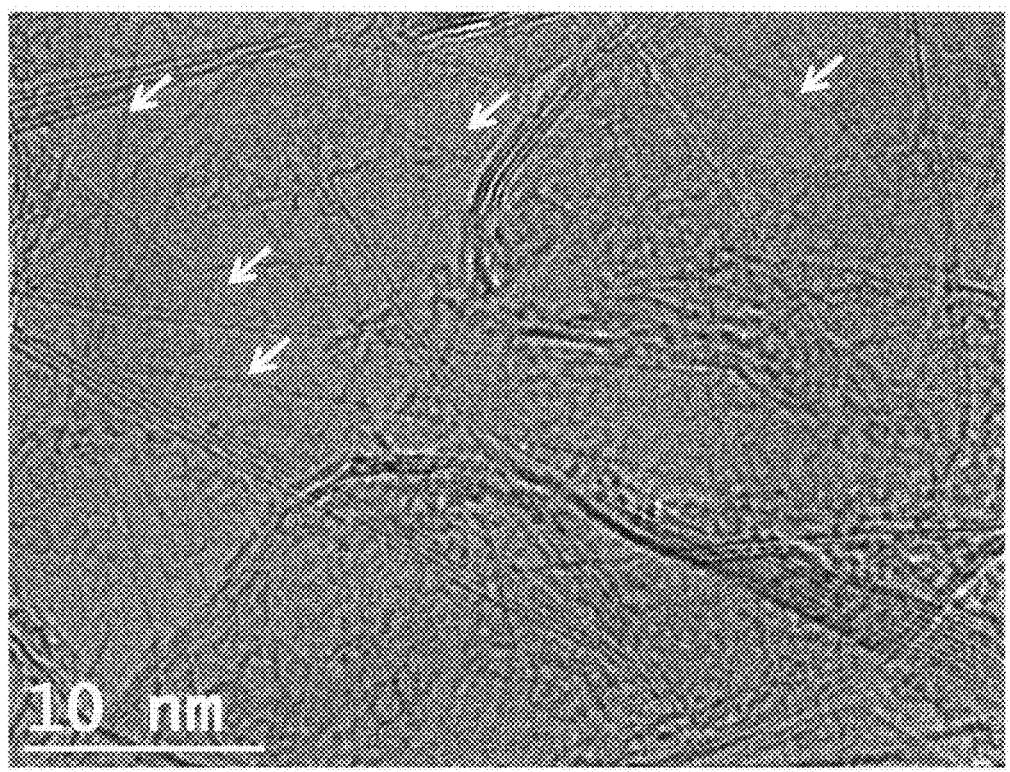
FIG. 6 shows a high resolution transmission electron microscopy (HRTEM) image, obtained using graphene sheets synthesized by the present invention system. As seen from the image, with a scale bar of 10 nm, these graphene sheets have advantageously only a few layers, many of them are monolayers identified by the arrows.

FIGS. 5 and 6 show examples of nanostructures produced in accordance with the present invention, FIG. 5 shows a scanning electron microscopy (SEM) image of flake-shaped graphene nanosheets, and FIG. 6 shows a high resolution transmission electron microscopy (HRTEM) image of graphene nanosheets with only a few monolayers. The results presented in these figures were achieved by the application of the invention process, which allowed to select the final product in a deterministic way.

Figure 7:
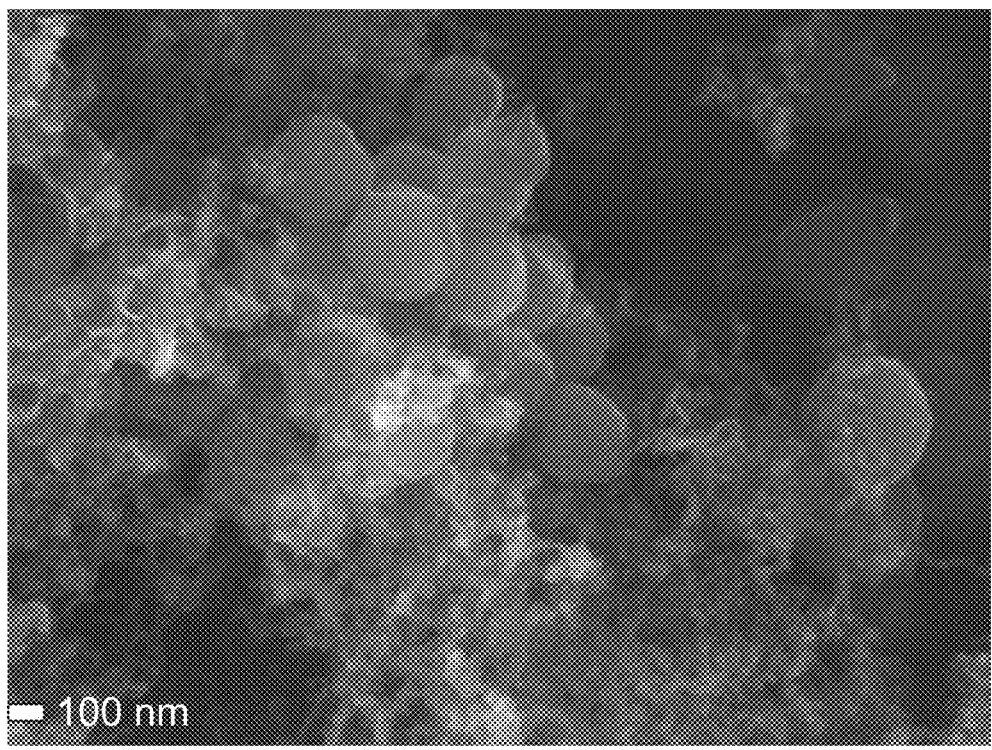
FIG. 7 shows an example of a scanning electron microscopy (SEM) image, with a scale bar of 100 nm, obtained using the result of the non-selective state of the art synthesis of carbon nanostructures (carbon nanoparticles, graphene nanosheets and nanodiamonds), adopting conditions of uncontrolled and/or reduced temperature/velocity axial gradients. The image has a 40000× magnification and was obtained in SEI mode with secondary electrons and an applied working voltage of 15.0 kV.

On the other hand, FIG. 7 shows a scanning electron microscopy (SEM) image, obtained using non-selective production conditions according to a prior art process, where can be distinguished several carbon nanostructures, such as carbon nanoparticles, graphene nanosheets and nanodiamonds.

Please note that, while the examples presented herein relate to the production of graphene, the process, reactor and system of the present invention may be used to produce other two-dimensional nanostructures, such as graphene derivatives (for example N-graphene, F-graphene), germanene (the two-dimensional germanium homolog), hexagonal boron nitride, among others.

In the context of the present invention, the term "two-dimensional nanostructures" refers to sheets of nanometric thickness consisting of a limited number (typically between 1-3) of atomic layers.

The term "self-standing nanostructures" refers to independent nanostructures capable of supporting their own weight without deteriorating, and which are created in the form of flakes in suspension, without the need of using support substrates.

The term "stream" refers to a moving fluid.

The expression "microwave plasma" refers to an ionized gas, generated by applying an electric field of a surface wave excited by microwave power. The surface wave propagates at the interface between the plasma and a dielectric medium, where the electric field has maximum intensity. When propagating, the surface wave creates a plasma and generates in a self-consistent way its own propagation structure.

By "precursor" is meant an atomic or molecular product which constitutes the raw material for building nanostructures.

By "precursor constituents" is meant the chemical elements of which the precursor is made, i.e., one or more of the following chemical elements: carbon, boron, germanium, nitrogen, oxygen, hydrogen and fluorine.

By "nucleation of precursor constituents" or just "nucleation" is meant the step in which sets of one or more precursor constituents dispersed in the inert gas join in agglomerates, in nanometric scale.

By "selective" production is meant the deterministic selection of the desired end product, for example by avoiding the appearance of alotropic variants. That is, the controlled production of only one type of allotrope for which the respective operating parameters have been defined, namely, flow rate, microwave power and power of the infrared radiation source.

Note that independently of the explicit presentation of the quantitative expression "about X", any X value presented in the course of the present description is to be interpreted as an approximate value of the actual X value, since such an approximation to the real value would reasonably be expected due to experimental and/or measurement conditions that introduce deviations from the real value.

In the context of the present description, the term "comprising" and its verbal variations are to be understood as "including, among others". As such, the term should not be interpreted as "consisting only of".

In the context of the present application, the use of the expression "and/or" is intended to mean that both conditions are met or only one of them occurs. For example, the term "cooling device and/or ultraviolet radiation source" means "cooling device and ultraviolet radiation source" or "cooling device" or "ultraviolet radiation source".

The invention process for the production of self-standing two-dimensional nanostructures using plasma technology comprises the following steps:
(a) producing a stream of a mixture of at least one inert gas and at least one precursor,
(b) decomposing the precursor into its atomic and molecular constituents by means of a microwave plasma, the said plasma being created from the stream of the mixture of the previous step,
(c) exposing the precursor constituents formed in the previous step to infrared radiation and, subsequently,
(d) collecting the nanostructures resulting from the nucleation of precursor constituents.

In step a) of producing a stream, the inert gas is selected from the group comprising helium, neon, argon, krypton, xenon or a mixture thereof, and the precursor may have a chemical composition containing one or more of the following elements: carbon, boron, germanium, nitrogen, oxygen, hydrogen and fluorine. By way of example, gaseous precursors, such as methane, ethylene, acetylene or diborane, may be used; or liquid precursors, such as ethanol, propanol, butanol or methanol, or solid precursors such as, for example, germanium monoxide or germanium dioxide.

The mixture of gases and precursors can be injected in a stream regime, for example in an admission part (8) of a reactor, with flow rate comprised between $4.2 \times 10^{-6}$ and $8.3 \times 10^{-4}$ standard cubic meters per second ($m^3/s$), preferably between $8.3 \times 10^{-6}$ and $3.3 \times 10^{-4}$ $m^3/s$, more preferably between $1.7 \times 10^{-5}$ and $1.7 \times 10^{-4}$ $m^3/s$.

The said stream is exposed to a high frequency electric field, with a frequency ranging from 10 MHz to 28 GHz, preferably from 100 MHz and 14 GHz, more preferably from 500 MHz and 3 GHz, most preferably 2.45 GHz, belonging to a surface wave (5), excited by microwave power (7), with a power ranging from 100 to 60000 W, preferably from 500 to 10000 W, more preferably from 1000 and 6000 W, most preferably from 2000 and 6000 W.

This microwave power (7) is applied, for example, by means of a field applicator (6), to generate a high energy density (between 0.1 and 1 $GW/m^3$) plasma (2,3,4) that decomposes the precursor or precursors present in the stream into its atomic and molecular constituents.

The atomic and molecular constituents of the precursors flow from the hot plasma zone (20'), where they were produced in gas phase, to a colder, nucleation zone (21'), where the two-dimensional nanostructures are produced and grown autonomously.

The control of the spatial gradients, of the temperature and the stream velocity of the gas mixture, allows to selectively produce the desired two-dimensional nanostructures.

The adjustment of these spatial gradients is achieved by applying, for example around the reactor, an infrared radiation source (11) and optionally, a cooling device (10) and/or an ultraviolet radiation source.

In one embodiment of the invention process, the precursor constituents are further subjected to ultraviolet radiation in step (c). Ultraviolet radiation is generated by an ultraviolet radiation source operating in a power range comprised between 50 W to 3000 W, preferably between 100 W to 2500 W, more preferably between 150 W to 2000 W, most preferably between 200 W to 1500 W.

In addition, the stream may be subjected, between step (a) and step (b), to a cooling by means of a cooling device operating in a temperature range comprised between 40 to 220° C., preferably between 40 to 200° C., more preferably between 40 to 180° C., most preferably between 40 to 150° C.

In a preferred embodiment of the process, both infrared and ultraviolet radiation are applied in step (c), as well as the cooling of the stream between step (a) and step (b).

Surprisingly, the application of infrared radiation provides high quality nanostructures, clearly above the state of the art. Without pretending to theorize, infrared radiation seems to intervene favorably in controlling the number of monolayers per sheet and the percentage of $sp^3$ bonds of carbon.

The required infrared radiation to the process is generated by an infrared radiation source (11) operating in a power range comprised between 50 W to 3000 W, preferably between 100 W to 2500 W, more preferably between 150 W to 2000 W, most preferably between 200 W to 1500 W.

The combination of ultraviolet radiation with infrared radiation provides even better results, such combination seems to intervene in order to improve the removal efficiency of oxygen groups that are attached to the graphene structure, contributing to further improve the final product quality.

The gas temperature spatial gradient ranges from 15,000 K/m to 75,000 K/m, and the reactor wall temperature ranges from 300 K to 1200 K.

After nucleation of precursor constituents, the solid nanostructures are collected, for example, in a membrane filtering device (22).

In brief, the invention process is based on injecting, into a microwave plasma reactor, a mixture (9) of at least one inert gas and at least one precursor in stream regime.

The stream is subjected to a surface wave (5) electric field, excited by the use of microwave power (7) which is introduced, for example, into a field applicator (6), generating high energy density plasmas (2,3,4) that break the precursor into its atomic and/or molecular constituents. These precursor constituents produced in gas phase by the plasma in reactor zones (19', 20') (see FIG. 2) diffuse to a reactor nucleation zone (21'), where they aggregate into solid nanostructures, which are then collected, for example, in a membrane filtering device (22).

Surprisingly, the use of an infrared radiation source (11) disposed in the referred reactor nucleation zone (21') provides high quality nanostructures, allowing the control of the number of monolayers per sheet and the percentage of $sp^3$ bonds of carbon.

The optional use of a cooling device (10) and/or of an ultraviolet radiation source, provides an even more controlled adjustment, of the spatial gradients, of the temperature and the stream velocity of the gas and precursor mixture, which contributes favorably to the deterministic selection of the desired end product.

The present invention also refers to a microwave plasma reactor for the fabrication of self-standing two-dimensional nanostructures.

Figure 1:
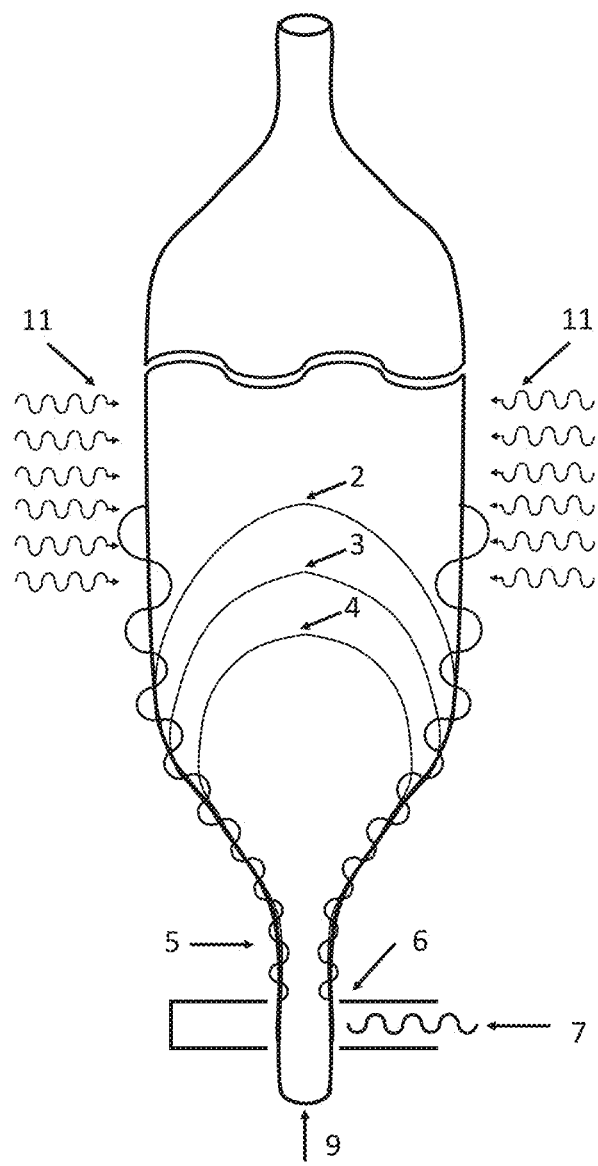
FIGS. 1 to 3 show longitudinal cross-sectional drawings of a preferred system of the invention, also showing some physical characteristics related to the production process of self-standing nanostructures, such as the gas temperature gradients (13, 15, 16) inside the reactor (FIG. 2) also referred to as (T1, T2 and T3); and gas velocity gradients (17, 18) (FIG. 3), whose control allows to select the production of self-standing two-dimensional nanostructures according to the invention.
Figure 2:
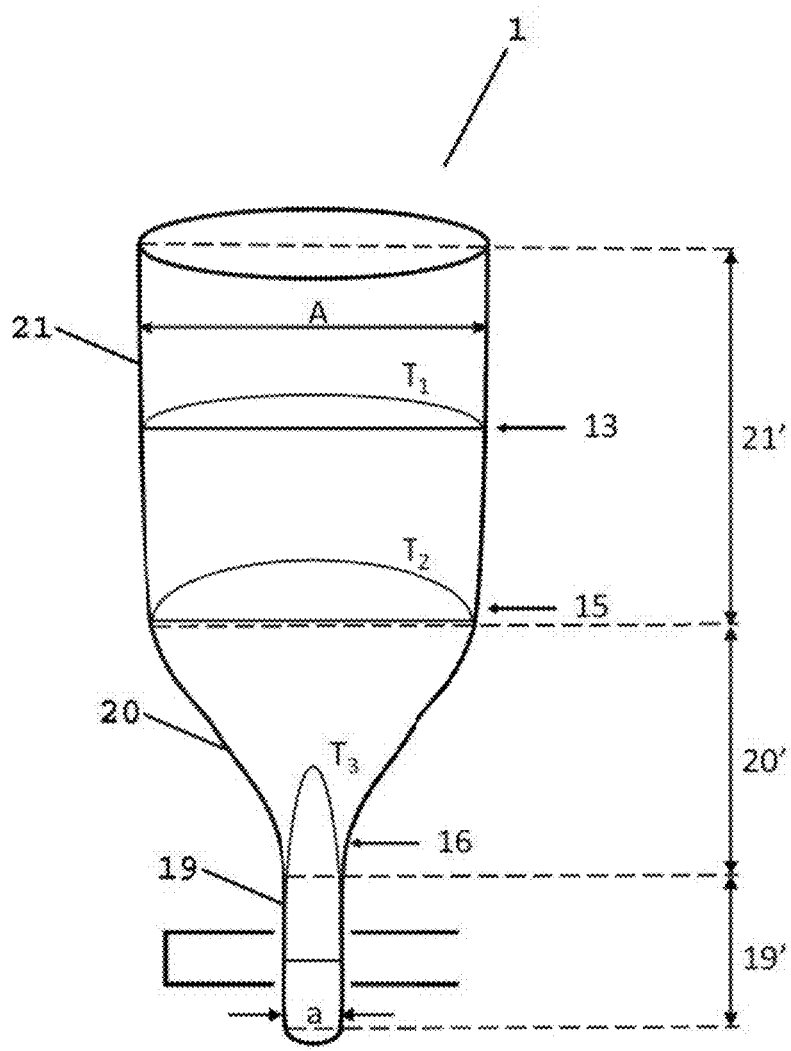

With reference to FIG. 2, the invention reactor for the production of self-standing two-dimensional nanostructures has a hollow body (1), whose body (1) comprises:
   a plasma creation surface wave launching part (19),
   a precursor constituents nucleation part (21) and
   a transient part (20) having the first and the second ends connected, respectively, to the surface wave launching part (19) and to the nucleation part (21), providing fluid communication between these parts (19, 21),
   wherein the said parts (19, 20, 21) define, respectively, in the reactor three inner zones (19', 20', 21') of operation, the reactor is characterized in that it has a smaller cross-sectional area in the first end of the said transient part (20) than in the second end.

In a preferred embodiment of the invention, the cross-sectional area of the transient part (20) is progressively increasing from its first to its second end.

In one aspect of the invention reactor, the said parts (19, 20, 21) are integrally connected to each other, forming a single piece.

In another preferred embodiment of the invention reactor, its hollow body (1) further comprises an admission part (8), to admit a mixture of at least one inert gas and at least one precursor, being the admission part (8) integrated in the surface wave launching part (19) or attached to the surface wave launching part (19) through connections.

The reactor hollow body (1) is formed by a dielectric material selected from the group consisting of quartz, sapphire, alumina and combinations thereof.

In operation, the said stream of a mixture of a gas and a precursor crosses several reactor zones (19', 20', 21'), which hollow body (1) has an increasing hollow cross-section area.

Figure 3:
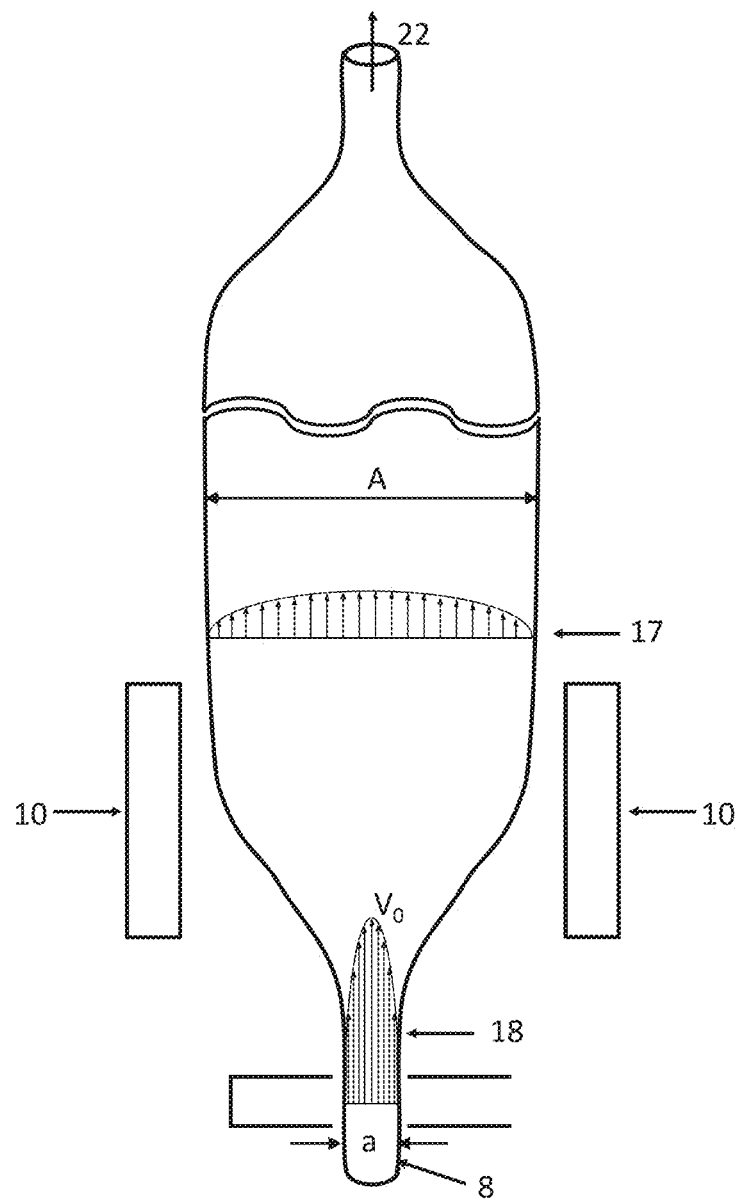

The process for producing self-standing two-dimensional nanostructures starts in the zone (19') of smaller cross-sectional area (a), where surface waves are launched; following to a transient zone (20'), with a gradually increasing cross-sectional area, for example according to the mathematical expression A=na (where n represents the ratio A/a with values between 1-20) (see FIGS. 2 and 3); and finally to a nucleation zone (21'), with a larger cross-sectional area (A) than the cross-sectional area (a) of zone (19').

This reactor body (1) geometry provides a controlled reduction of speed and stream temperature with a positive impact on the selective production of the desired two-dimensional nanostructures, in particular in the significant increase its production rate.

The present invention further relates to a production system of self-standing two-dimensional nanostructures.

The invention system comprises:
   a microwave plasma reactor having a hollow body (1) comprising, at least, a surface wave launching part (19), a plasma formation transient part (20), and a nucleation part (21) of precursor constituents; the said parts (19, 20, 21) define respectively in the reactor three inner zones (19', 20', 21') of operation that are connected sequentially in fluid communication with each other,
   wherein the system further comprises
      at least, one infrared radiation source (11) on the outside of the plasma reactor hollow body (1), arranged to irradiate the said inner zone (21') defined by the nucleating part (21) of the referred reactor body (1).

The source of infrared radiation (11) operates in a power range comprised between 50 W to 3000 W, preferably between 100 W to 2500 W, more preferably between 150 W to 2000 W, most preferably between 200 W to 1500 W.

In one embodiment of the system, it further comprises a cooling device (10) on the outside of the plasma reactor hollow body (1), wherein the cooling device (10) is arranged to cool, at least, the inner zone (20') defined by the transient part (20) of the said reactor body (1).

The cooling device (10) is operable in a temperature range comprised between 40 to 220° C., preferably between 40 to 200° C., more preferably between 40 to 180° C., most preferably between 40 to 150° C.

In yet another embodiment, the system further comprises an ultraviolet radiation source on the outside of the plasma reactor hollow body (1), arranged to irradiate, at least, the inner zone (21') defined by the nucleation part (21) of the said reactor body (1). The source of ultraviolet radiation operates in a power range comprised between 50 W to 3000 W, preferably between 100 W to 2500 W, more preferably between 150 W to 2000 W, most preferably between 200 W to 1500 W.

The parts (19, 20, 21) of the reactor body (1) may be integrally connected to each other in order to form a single piece.

The said microwave plasma reactor body (1) is constructed from a dielectric material selected from the group comprising quartz, sapphire, alumina and similar materials and combinations thereof.

In a most preferred embodiment of the invention system, this is characterized in that it comprises:
   A microwave plasma reactor having a hollow body (1) comprising at least:
      a plasma creation surface wave launching part (19),
      a precursor constituents nucleation part (21) and
      a transient part (20) having the first and the second ends connected, respectively, to the surface wave launching part (19) and to the nucleation part (21), providing fluid communication between these parts (19, 21),
      wherein the said parts (19, 20, 21) define respectively in the reactor body (1) three inner zones (19', 20', 21') of operation; and the said first end of the transient part (20) has a smaller cross-sectional area than the cross-sectional area of the said second end of the transient part (20), and
   at least, one infrared radiation source (11) on the outside of the said reactor hollow body (1), arranged to irradiate the inner zone (21') defined by the nucleating part (21) of the said reactor body (1).

In a variant of the previous embodiment, in addition to the infrared radiation source (11) on the outside of the hollow body (1), a cooling device (10) can also be arranged on the outside of the reactor body (1), to cool, at least, the inner zone (20') defined by the transient part (20) of the said reactor body (1). In addition to the cooling device (10), or in alternative to this one, an ultraviolet radiation source can also be arranged on the outside of the plasma reactor hollow body (1), to irradiate, at least, the inner zone (21') defined by the nucleating part (21) of said reactor body (1).

In another variant of the previous embodiment, the said parts (19, 20, 21) of the reactor body (1) are integrally connected to each other, forming a single piece of dielectric material. Optionally, the parts (19, 20, 21) of the reactor body (1) are connected with each other by suitable connection means known by a person skilled in the art.

The following are several examples of selective production of self-standing two-dimensional nanostructures using plasma technology according to the present invention. Of course, the examples described below should not be interpreted as constituting any kind of limitation to the scope of the present invention, which is defined in the independent claims.

EXAMPLES

Figure 4:
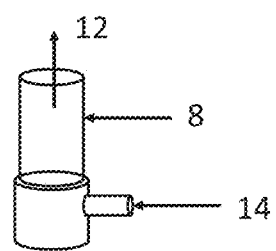
FIG. 4 shows a schematic representation of an exemplificative injection unit of the plasma reactor.

1. For the production of graphene with a production rate of more than 1 gram per hour, a plasma reactor formed by a quartz tube comprising a surface wave launching part (19) with an internal radius of 18.0 mm, a transient part (20), with an increasing internal radius, of 18.0 mm to 75.0 mm; and a nucleating part (21), with an internal radius of 75.0 mm, is used. First, a mixture composed of ethylene or acetylene as precursors, with an incorporation rate in the mixture of $8.3 \times 10^{-6}$ m$^3$/s and argon as carrier gas, with a flow rate of $8.3 \times 10^4$ m$^3$/s, is produced. Flow rates are monitored by a controller coupled to two flow meters. Next, the said mixture formed by ethylene or acetylene and argon is introduced in stream regime (12) through a connection (14), using an injection unit (see FIG. 4), in an admission part (8) of the reactor, constituted by a quartz tube and installed in the surface wave launching part (19). Any other gas injection system capable of performing this function may be optionally used. Subsequently, the stream of the said mixture proceeds through the part (20) of a microwave plasma torch (5) induced by a surface wave at atmospheric pressure.

This plasma torch comprises a microwave generator, operating at a frequency of 2.45 GHz, a waveguide system (7) which includes an insulator, directional couplers and a tuner, and a surfatron type field applicator (6). The system is closed by an adjustable component that short-circuits the microwave. The microwave power provided to the plasma is 60 kW. The stream is subjected to infrared (IR) radiation, through an infrared radiation source (11) operating with an applied power of 3000 W, along with ultraviolet radiation (UV), also operating with an applied power of 3000 W. The IR and UV radiation is generated by a matrix of electric lamps. The thus formed two-dimensional graphene nanostructures are collected by a membrane filtering device (22) coupled to a vacuum pump.

2. For the production of germanene, with a production rate of more than 2 milligrams per hour, a plasma reactor formed by a quartz tube comprising a surface wave launching part (19) with an internal radius of 18.0 mm, a transient part (20), with an increasing internal radius, of 18.0 mm to 32.0 mm, and a nucleating part (21), with an internal radius of 32.0 mm, is used. The mixture used is composed by a solid precursor, in this case germanium monoxide, with an incorporation rate in the mixture of 8.0 milligrams/hour and argon is used as carrier gas, with a flow rate of $8.3 \times 10^{-5}$ m$^3$/s. The said mixture is injected, in stream regime (12), in an admission part (8) of the reactor, situated in the surface wave launching part (19), then passing through the hot zone (20') of a microwave plasma torch, being the plasma generated by a surface wave (5) at atmospheric pressure. The plasma torch comprises a microwave generator, operating at a frequency of 2.45 GHz, a waveguide system (7) which includes an insulator, directional couplers and a tuner, and a surfatron type field applicator (6). The system is closed by an adjustable component that short-circuits the microwave. The microwave power provided to the plasma is 6 kW. The quartz tube wall temperature is maintained at 220° C. using a cryostat device (10). The stream is subjected to infrared (IR) radiation generated by a matrix of electric lamps, with an applied power of 1000 W. Finally, the two-dimensional nanostructures are collected by a membrane filtering device (22) coupled to a vacuum pump.

3. For the alternative production of germanene with a production rate of more than 2 milligrams per hour, the system uses the assembly described above (example 2) with the smallest radius of 18.0 mm and the largest of 32.0 mm. The mixture used is composed by a solid precursor, in this case germanium dioxide, with an incorporation rate in the mixture of 8.0 milligrams/hour, and argon is used as carrier gas, with a flow rate of $8.3 \times 10^{-5}$ m$^3$/s. The plasma torch used is the same as described above (example 2), operating at the same frequency of 2.45 GHz, and with the same type of field applicator (6). The microwave power provided to the plasma is 6 kW. The stream is subjected to infrared (IR) radiation, generated by a matrix of electric lamps with an applied power of 1500 W. Finally, the two-dimensional nanostructures are collected by a membrane filtering device (22) coupled to a vacuum pump.

4. For the production of graphene with a production rate of about 0.1 gram per hour, the system is composed by a plasma reactor formed by a quartz tube comprising a surface wave launching part (19) with an internal radius of 7.5 mm, a transient part (20), with an increasing internal radius, of 7.5 mm to 21.0 mm; and a nucleating part (21), with internal radius 21.0 mm, is used. The system works with a mixture composed by a gaseous precursor, in this case methane, with an incorporation rate in the mixture of $3.3 \times 10^{-7}$ m$^3$/s and argon is used as carrier gas, with a flow rate of $6.7 \times 10^{-5}$ m$^3$/s. Flow rates are monitored by a controller coupled to two flow meters. The said mixture is injected, in stream regime, in an admission part (8) of the reactor situated in the surface wave launching part (19), then passing through the hot zone (20') of a microwave plasma torch, generated by a surface wave (5) at atmospheric pressure. The plasma torch comprises a microwave generator, operating at a frequency of 2.45 GHz, a waveguide device (7) which includes an insulator, directional couplers and a tuner, and a surfatron type field applicator (6). The system is closed by an adjustable component that short-circuits the microwave. The microwave power provided to the plasma is 4 kW. The stream is subjected to infrared (IR) radiation generated by a matrix of electric lamps, with an applied power of 500 W. Finally, the two-dimensional nanostructures are collected by a membrane filtering device (22) coupled to a vacuum pump.

5. For the production of hexagonal boron nitride with a production rate of about 20 milligrams per hour, the system uses the assembly described above (Example 4) with the smallest internal radius of 7.5 mm and the largest of 21.0 mm. The mixture used is composed by a gaseous precursor, in this case diborane, with an incorporation rate in the mixture of $1.7 \times 10^{-7}$ m$^3$/s and argon is used as carrier gas, with a flow rate of $3.3 \times 10^{-5}$ m$^3$/s. The plasma torch used is the same as described above (example 4), operating at the same frequency of 2.45 GHz, and with the same type of field applicator (6). The microwave power provided to the plasma is 2 kW. The stream is subjected to infrared (IR) radiation, generated by a matrix of electric lamps, with an applied power of 1000 W. Finally, the two-dimensional nanostructures are collected by a membrane filtering device (22) coupled to a vacuum pump.

6. For the production of graphene with a production rate of about 2 miligram per hour, the system is composed by a plasma reactor formed by a quartz tube comprising a surface wave launching part (19) with an internal radius of 7.5 mm, a transient part (20), with a constant internal radius of 7.5 mm, and a nucleating part (21), with the same internal radius of 7.5 mm, is used. The system works with a mixture composed by a liquid precursor, in this case ethanol, that after being vaporized using an ultrasonic bath, has an incorporation rate in the mixture of $1.7 \times 10^{-8}$ m$^3$/s, argon is used as carrier gas, with a flow rate of $4.2 \times 10^{-6}$ m$^3$/s. Flow rates are monitored by a controller coupled to two flow meters. The said mixture is injected, in stream regime, in an admission part (8) of the reactor situated in the surface wave launching part (19), then passing through the hot zone (20') of a microwave plasma torch, generated by a surface wave (5) at atmospheric pressure. The plasma torch includes a microwave generator, operating at a frequency of 2.45 GHz, a waveguide device (7) that includes an insulator, directional couplers and a tuner, and a surfatron type field applicator (6). The system is closed by an adjustable component that short-circuits the microwave. The microwave power provided to the plasma is 0.4 kW. The quartz tube wall temperature is maintained at 60° C. using a cryostat device. The stream is subjected to infrared (IR) radiation, operating with an applied power of 50 W, along with ultraviolet radiation (UV), also operating with an applied power of 50 W, the IR and UV radiation is generated by a matrix of electric lamps. Finally, the two-dimensional nanostructures are collected by a membrane filtering device (22) coupled to a vacuum pump.

7. For the production of graphene with a production rate of about 1 miligram per hour, the system uses the assembly described above (Example 6) with a constant internal radius of 7.5 mm in all areas (19, 20, 21). The system works with a mixture composed by a liquid precursor, in this case butanol or propanol, that after being vaporized using an ultrasonic bath, have an incorporation rate in the mixture of $1.7 \times 10^{-8}$ m$^3$/s and argon is used as carrier gas, with a flow rate of $4.2 \times 10^{-6}$ m$^3$/s. The plasma torch used is the same as described above (example 6), operating at the same frequency of 2.45 GHz, and with the same type of field applicator (6). The microwave power provided to the plasma is 0.4 kW. The quartz tube wall temperature is maintained at 40° C. using a cryostat device. The stream is subjected to infrared (IR) radiation, generated by a matrix of electric lamps with an applied power of 50 W. Finally, the two-dimensional nanostructures are collected by a membrane filtering device (22) coupled to a vacuum pump.

8. For the production of graphene with a production rate of about 1 gram per hour, a plasma reactor formed by a quartz tube comprising a surface wave launching part (19) with an internal radius of 18.0 mm, a transient part (20), with an increasing internal radius, of 18.0 mm to 32.0 mm; and a nucleating part (21), with an internal radius of 32.0 mm, is used. First, a mixture composed by ethylene as precursor, with an incorporation rate in the mixture of the $8.3 \times 10^{-6}$ m$^3$/s, and a mixture of carrier gases composed of 90% Argon with 5% Helium and 5% of Neon, with a total flow of $3.3 \times 10^{-4}$ m$^3$/s is produced. Flow rates are monitored by a controller coupled to two flow meters. Next, the said mixture formed by ethylene with the carrier gases is introduced in stream regime (12) through a connection (14), using an injection unit (see FIG. 4), in an admission part (8) of the reactor, constituted by a quartz tube and installed in the surface wave launching part (19). Subsequently, the stream of the said mixture proceeds through the part (20) of a microwave plasma torch generated by a surface wave (5) at atmospheric pressure. This plasma torch comprises a microwave generator, operating at a frequency of 2.45 GHz, a waveguide device (7) which includes an insulator, directional couplers and a tuner, and a surfatron type field applicator (6). The system is closed by an adjustable component that short-circuits the microwave. The microwave power provided to the plasma is 20 kW. The stream is subjected to infrared (IR) radiation through an infrared radiation source (11) generated by arrays of electric IR lamps, operating with an applied power of 2500 W. The thus formed two-dimensional graphene nanostructures are collected by an extraction device.

9. For the production of N-Graphene with a production rate of about 1 gram per hour, a plasma reactor formed by a quartz tube comprising a surface wave launching part (19) with an internal radius of 18.0 mm, a transient part (20), with an increasing internal radius, of 18.0 mm to 75.0 mm; and a nucleating part (21), with an internal radius of 75.0 mm, is used. The system works with a mixture composed by a carrier gas, in this case argon, with a flow rate of $3.3 \times 10^{-4}$ m$^3$/s and two precursors, a liquid precursor, in this case ethanol, plus a gaseous precursor, in this case Nitrogen, the ethanol after being vaporized using an ultrasonic bath, has an incorporation rate in the mixture of $7.5 \times 10^{-6}$ m$^3$/s. Nitrogen has an incorporation rate in the mixture of $8.3 \times 10^{-7}$ m$^3$/s. Flow rates are monitored by a controller coupled to two flow meters. Next, the said mixture formed by the carrier gas plus the two precursors is introduced in stream regime (12) through a connection (14), using an injection unit (see FIG. 4), in an admission part (8) of the reactor, constituted by a quartz tube and installed in the surface wave launching part (19). Subsequently, the stream of the said mixture proceeds through the part (20) of a microwave plasma torch generated by a surface wave (5) at atmospheric pressure. This plasma torch comprises a microwave generator, operating at a frequency of 2.45 GHz, a waveguide device (7) which includes an insulator, directional couplers and a tuner, and a surfatron type field applicator (6). The system is closed by an adjustable component that short-circuits the microwave. The microwave power provided to the plasma is 6 kW. The stream is subjected to infrared (IR) radiation through an infrared radiation source (11) generated by arrays of electric IR lamps, operating with an applied power of 2000 W. The thus formed two-dimensional graphene nanostructures are collected by an extraction device.

FIG. 5 shows a scanning electron microscopy (SEM) image, obtained using the result of the selective synthesis of graphene sheets, controlled by strong axial gradients of temperature and gas velocity. On the other hand, FIG. 7 shows an SEM image obtained using the non-selective synthesis of carbon nanostructures (carbon nanoparticles, graphene nanosheets and nanodiamonds) performed under conditions of uncontrolled and/or reduced temperature/velocity axial gradients. The SEM characterization was performed by a field emission gun scanning electron microscope, operating in secondary electron imaging mode with applied voltages in the range of 10-15 kV.

FIG. 6 shows a high resolution transmission electron microscopy (HRTEM) image, obtained using graphene sheets synthesized with the system described herein. The image was obtained using an HRTEM microscope, operating at an accelerating voltage of 200 kV. As can be seen, the edges of the sheets are clearly folded upwards, being possible to determine the number of atomic layers of each sheet. The HRTEM image revealed that many of the sheets are single atomic layers, some of the monolayers are identified by arrows in the figure.

The invention claimed is:

1. A process for producing self-standing two-dimensional nanostructures comprising the steps of:
   (a) producing a stream of a mixture of at least one inert gas and at least one precursor,
   (b) decomposing the precursor, of the stream of previous step, into its atomic and molecular constituents by means of a microwave plasma,
   (c) exposing the precursor constituents formed in the previous step to infrared radiation and, subsequently,
   (d) collecting the nanostructures resulting from the nucleation of precursor constituents, wherein the infrared radiation is generated by operating an infrared radiation source in a power range comprised between 50 W to 3000 W.

2. The process according to claim 1, further comprising the step of submitting the precursor constituents to ultraviolet radiation in step c).

3. The process according to claim 2, wherein the ultraviolet radiation is generated by operating an ultraviolet radiation source in a power range comprised between 50 W to 3000 W.

4. The process according to claim 1, wherein the process further comprises, between step a) and step b), a cooling of the said stream by means of a cooling device operating in a temperature range comprised between 40 to 220° C.

5. The process according to claim 1, wherein said stream produced in step (a) has a flow rate comprised between $4.2 \times 10^{-6}$ and $8.3 \times 10^{-4}$ m³/s.

6. The process according to claim 1, wherein the referred inert gas of the mixture of the step (a) is selected from the group consisting of helium, neon, argon, krypton, xenon and combinations thereof; and the precursor is selected from the group consisting of methane, ethylene, ethanol, methanol, propanol, butanol, acetylene, diborane, germanium monoxide, germanium dioxide, nitrogen and combinations thereof.

7. The process according to claim 1, wherein the microwave plasma is generated by a microwave source operating in a power range of 100 W to 60000 W.

8. The process according to claim 1, wherein the infrared radiation is generated by operating an infrared radiation source in a power range comprised between 100 W to 2500 W.

9. The process according to claim 1, wherein the infrared radiation is generated by operating an infrared radiation source in a power range comprised between 150 W to 2000 W.

10. The process according to claim 1, wherein the infrared radiation is generated by operating an infrared radiation source in a power range comprised between 200 W to 1500 W.

11. The process according to claim 2, wherein the ultraviolet radiation is generated by operating an ultraviolet radiation source in a power range comprised between 100 W to 2500 W.

12. The process according to claim 2, wherein the ultraviolet radiation is generated by operating an ultraviolet radiation source in a power range comprised between 200 W to 1500 W.

13. The process according to claim 1, wherein the process further comprises, between step a) and step b), a cooling of the said stream by means of a cooling device operating in a temperature range comprised between 40 to 200° C.

14. The process according to claim 1, wherein said stream produced in step (a) has a flow rate comprised between $8.3 \times 10^{-6}$ and $3.3 \times 10^{-4}$ m³/s.

* * * * *